United States Patent
Di Biase

(10) Patent No.: US 11,582,913 B2
(45) Date of Patent: Feb. 21, 2023

(54) MULTIPURPOSE RADIO-CONTROLLED VEHICLE

(71) Applicant: MDB S.r.l. CON SOCIO UNICO, Lanciano (IT)

(72) Inventor: Mario Di Biase, Lanciano (IT)

(73) Assignee: MDB S.R.L., Lanciano (IT)

( * ) Notice: Subject to any disclaimer, the term of this patent is extended or adjusted under 35 U.S.C. 154(b) by 693 days.

(21) Appl. No.: 16/656,860

(22) Filed: Oct. 18, 2019

(65) Prior Publication Data
US 2020/0120872 A1    Apr. 23, 2020

(30) Foreign Application Priority Data
Oct. 19, 2018   (IT) .......................... 102018000009635

(51) Int. Cl.
| | | |
|---|---|---|
| *A01D 75/00* | (2006.01) | |
| *A01D 34/00* | (2006.01) | |
| *A01D 34/835* | (2006.01) | |

(52) U.S. Cl.
CPC .......... *A01D 75/00* (2013.01); *A01D 34/008* (2013.01); *A01D 34/8355* (2013.01)

(58) Field of Classification Search
CPC .............. B62D 33/0617; B62D 33/063; B62D 49/0678; B62D 51/001; B62D 51/007; B62D 55/06; B62D 55/084; A01D 75/00; A01D 34/008; A01D 34/8355; A01D 34/86
See application file for complete search history.

(56) References Cited

U.S. PATENT DOCUMENTS

| | | | | |
|---|---|---|---|---|
| 3,721,077 A | * | 3/1973 | Van Der Lely .... | B62D 33/0636 37/231 |
| 4,996,830 A | * | 3/1991 | Davison ............... | A01D 34/866 56/14.7 |
| 5,098,018 A | * | 3/1992 | Hadar ................. | A01M 7/0064 239/176 |
| 7,175,380 B2 | * | 2/2007 | Wilson ................. | A01D 34/866 56/14.7 |
| 10,028,442 B1 | * | 7/2018 | Crosby .................... | B60P 3/00 |
| 10,570,588 B1 | * | 2/2020 | Elkins ................ | G06K 19/0723 |
| 10,807,847 B2 | * | 10/2020 | Ourada ............... | B66F 9/07577 |

FOREIGN PATENT DOCUMENTS

| | | | | | |
|---|---|---|---|---|---|
| CA | 2652056 C | * | 5/2014 | ......... | B60G 17/0165 |
| CN | 104853976 A | * | 8/2015 | ........... | B60K 17/356 |
| CN | 111287230 A | * | 6/2020 | ............... | E02F 3/34 |

(Continued)

OTHER PUBLICATIONS

Italian Search Report dated Oct. 15, 2019 for Italian application No. 201800009635; 7pgs.

*Primary Examiner* — Arpad F Kovacs
(74) *Attorney, Agent, or Firm* — Ruggiero McAllister & McMahon LLC

(57) ABSTRACT

A radio-controlled vehicle includes a supporting structure, an engine unit, a kinetic unit and a remote control for operating the vehicle remotely, The radio-controlled vehicle also has a cab configured to house, in use, a person. The cab and the supporting structure are mutually movable with respect to each other to selectively arrange the cab in a desired position with respect to the supporting structure.

12 Claims, 6 Drawing Sheets

(56) References Cited

FOREIGN PATENT DOCUMENTS

| | | | | |
|---|---|---|---|---|
| DE | 2814305 | A1 | 10/1979 | |
| DE | 19621962 | A1 * | 10/1996 | ............. B61C 17/04 |
| DE | 19645956 | A1 * | 3/1998 | ........... B62D 33/063 |
| DE | 102004020435 | A1 | 9/2004 | |
| EP | 0631906 | A1 * | 1/1995 | ........... A01D 41/127 |
| EP | 0881139 | A1 | 12/1998 | |
| EP | 1364572 | A1 * | 11/2003 | ............. A01D 34/86 |
| FR | 3049014 | A1 | 9/2017 | |
| GB | 2031355 | A * | 4/1980 | ................ B60P 3/16 |
| GB | 1579797 | A * | 11/1980 | ............. B62D 7/142 |
| GN | 106973617 | A | 7/2017 | |
| WO | WO-2007139878 | A2 * | 12/2007 | ........ B60G 17/0165 |
| WO | 2010121617 | A1 | 10/2010 | |
| WO | WO-2014182217 | A1 * | 11/2014 | ............. A01G 23/00 |
| WO | WO-2019177808 | A1 * | 9/2019 | ............. B62D 11/20 |
| WO | WO-2021081655 | A1 * | 5/2021 | .............. E02F 9/123 |

\* cited by examiner

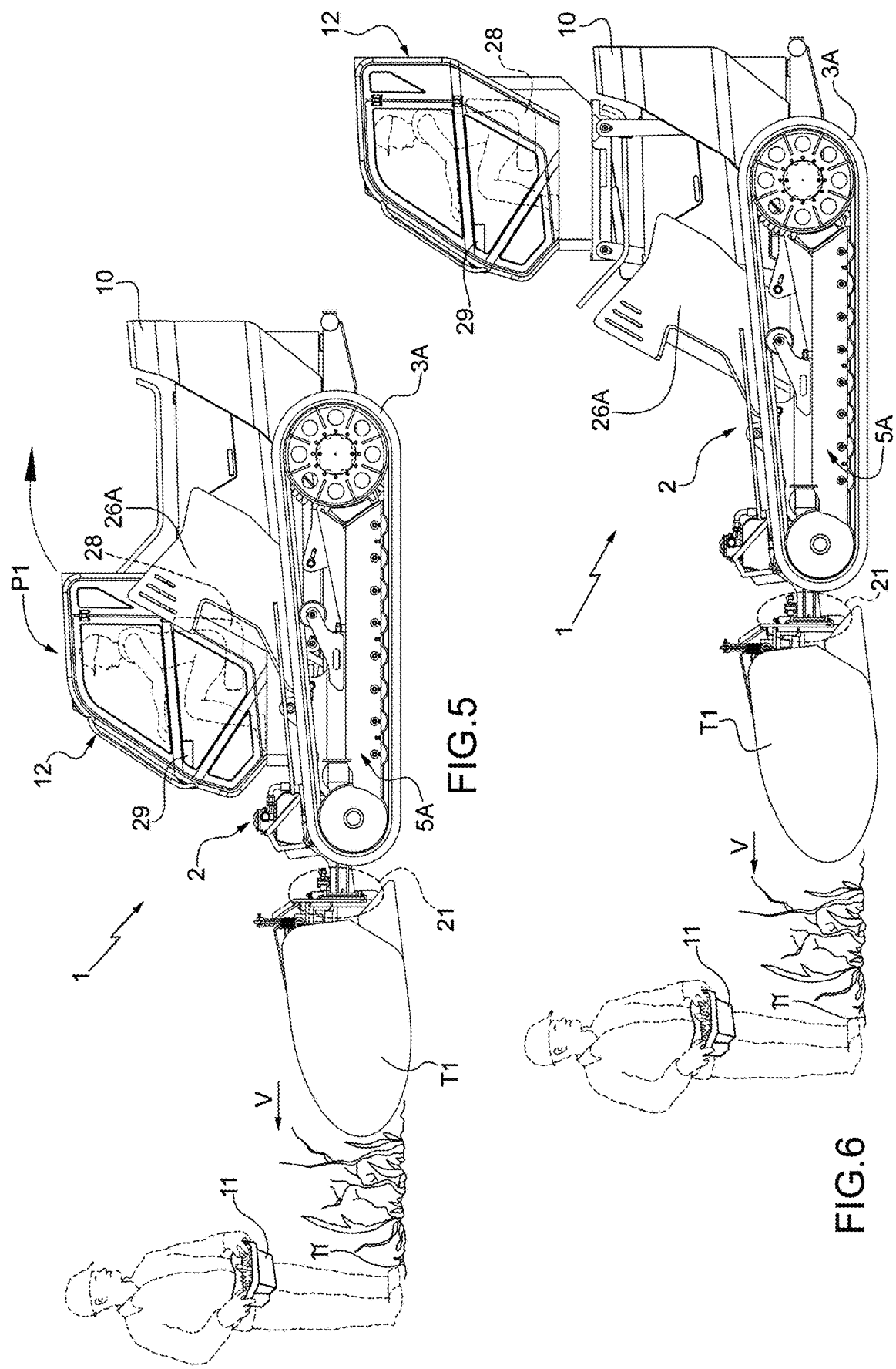

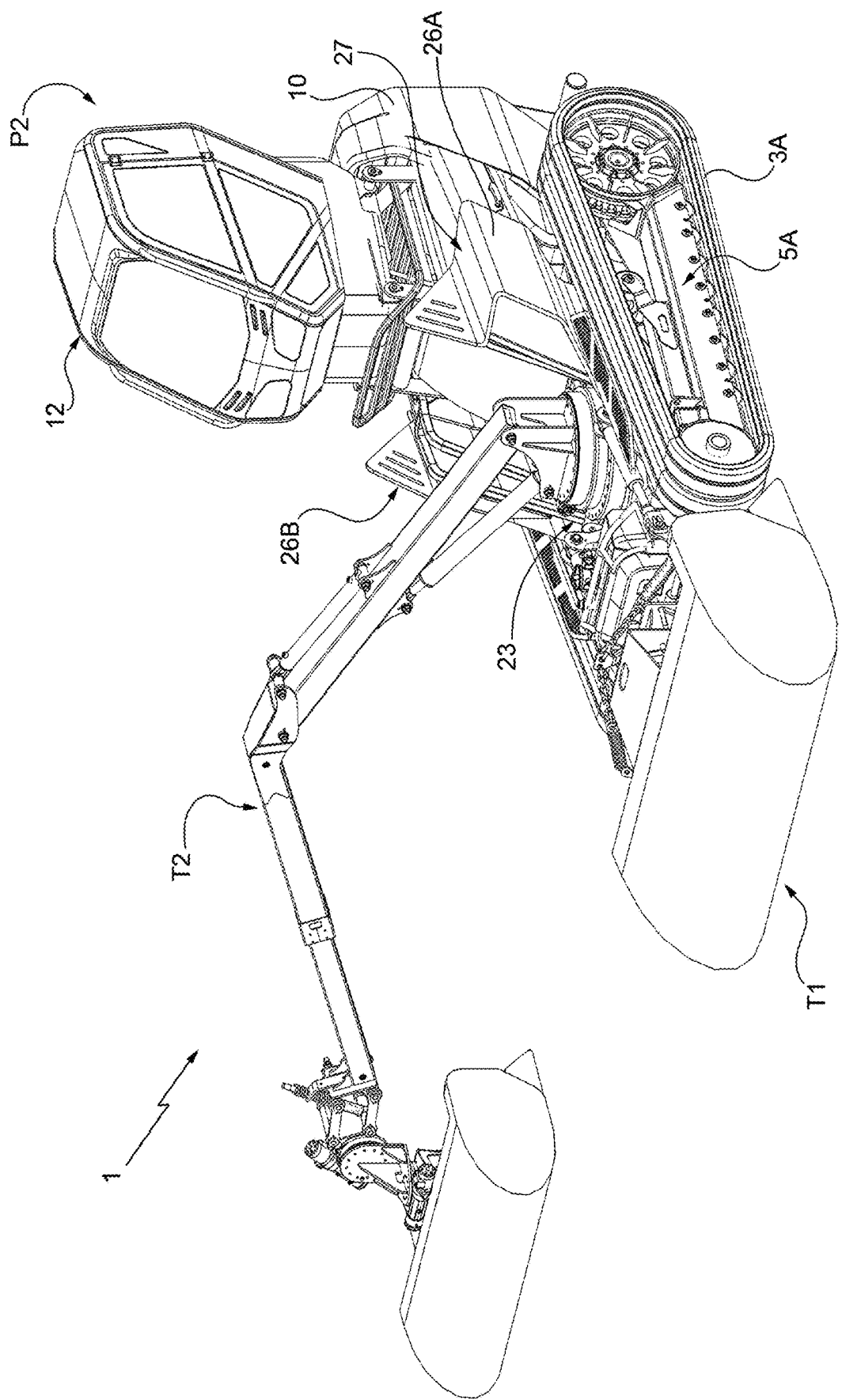

MULTIPURPOSE RADIO-CONTROLLED VEHICLE

CROSS-REFERENCE TO RELATED APPLICATIONS

This patent application claims priority from Italian patent application no. 102018000009635 filed on Oct. 19, 2018, the entire disclosure of which is incorporated herein by reference.

TECHNICAL FIELD

This patent application relates to a multipurpose radio-controlled vehicle, in particular one suitable for carrying out road or parkland maintenance, or reclamation work.

STATE OF THE PRIOR ART

It is known to carry out jobs in agriculture and road maintenance, for example cutting grass, shrubs and bushes, by means of a vehicle, for example a tractor or a truck, which operates a mulcher.

As a rule, the mulcher is fixed directly to the vehicle, or connected via a mechanical arm, the entire assembly of the two components being generally known as a boom mower (or boom mulcher).

As a rule, the mulcher on its own is carried at the front of the vehicle, while the boom mower is carried behind the operator's seat, with respect to the driving direction. In some cases, the boom mower is installed in front of the operator's position.

In particular, during use of the boom mower, a mechanical arm vertically supports the mulcher from above, the latter projecting sideways from the vehicle and made to pass over the ground (roadsides, ditches, fields and the like).

Vehicles of a known type with a boom mower behind the operator have the drawback that the operator must continually look backwards to check that operations take place correctly. Firstly, this obviously causes physical pain for the operator, who must work for hours a day continually assuming unnatural positions. In addition, the operator's field of view is extremely limited, as looking backwards over the shoulder (or using rear-view mirrors) cannot provide a complete view of the area being treated.

Vehicles of a known type with a boom mower in front of the operator do not allow the operator to have a complete view, as the bulk of the mulcher's support arm blocks a large part of the field of view.

Vehicles of a known type also have the further drawback in that it necessary for the vehicle to be driven on the road and therefore entails blocking traffic in the lane in which it is being driven along.

Furthermore, vehicles of a known type require the operator to stay on board the vehicle, which is a limitation as the vehicle cannot be driven off-road or on steep slopes, due to obvious hazards for the operator. In addition, vehicles of a known type do not allow the operator to leave the vehicle when in operation.

OBJECT OF THE INVENTION

The object of the present invention is to provide a vehicle that allows the operator full visibility of the area to be treated during use. The object of the present invention is to provide a vehicle that enables working even on steeply sloped terrains in complete safety. The object of the present invention is to provide a multipurpose vehicle.

The object of the present invention is to provide a vehicle that enables overcoming the above-described drawbacks.

According to the present invention, a vehicle is provided as set forth in the appended claims.

BRIEF DESCRIPTION OF DRAWINGS

The invention shall now be described with reference to the accompanying drawings, which illustrate a non-limitative embodiment, in which:

FIGS. 5 and 6 are side views of the vehicle of FIG. 1 in different respective operating configurations;

FIG. 7 is a perspective view of a vehicle according to the present invention in a further operating configuration.

PREFERRED EMBODIMENT OF THE INVENTION

Figure 1:
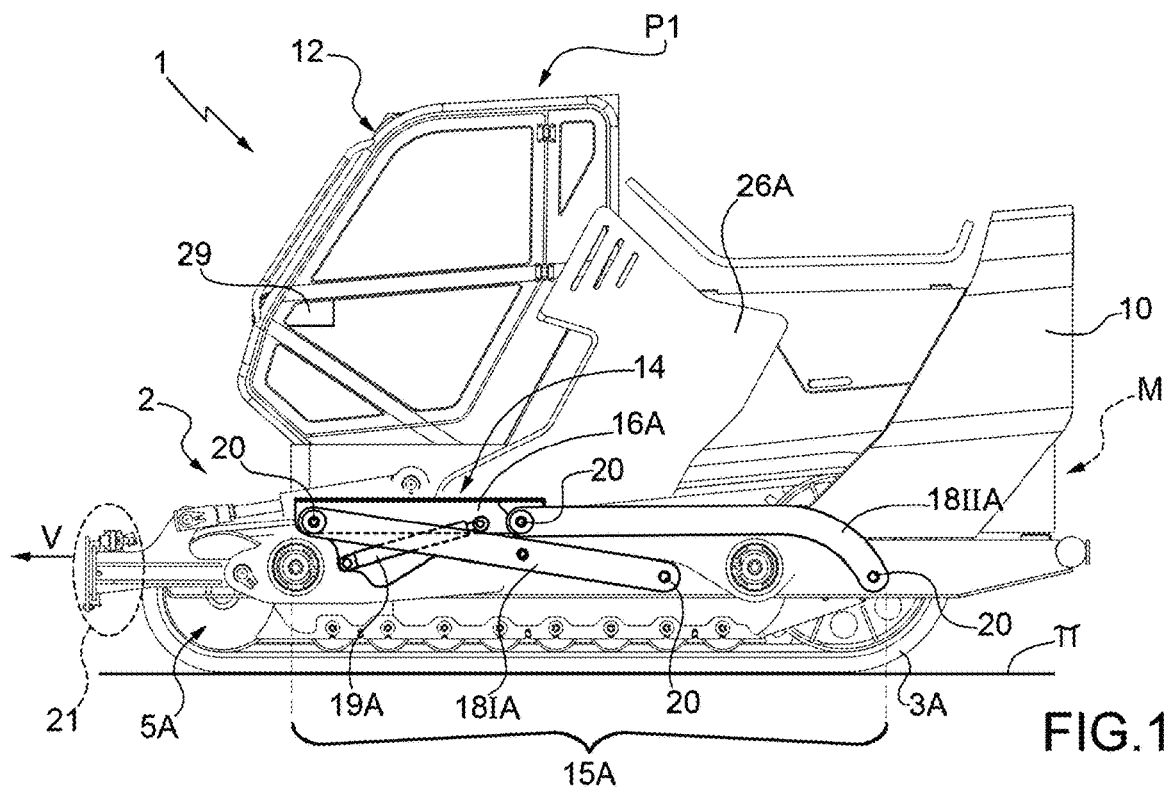
FIGS. 1 to 3 are side views of a vehicle according to the present invention in different respective operating configurations.

In FIG. 1, reference numeral 1 indicates, as a whole, a radio-controlled vehicle according to the present invention.

Advantageously, the radio-controlled vehicle 1 is configured, as will be explained in greater detail below, so as to ensure correct operation even on steep slopes, namely slopes up to approximately 60°. In particular, the vehicle 1 has a very low centre of gravity, which enables ensuring maximum stability.

It should be noted that hereinafter the terms front, rear, left and right will be used with reference to the direction of forward travel v of the radio-controlled vehicle 1 during forward driving. To distinguish between two substantially identical components, hereinafter the reference numbers of components to the left of the plane of symmetry of the radio-controlled vehicle 1 are identified by suffix A; while the reference numbers of components to the right are identified by suffix B. In a similar manner, the reference numbers of the front components are identified by suffix I and the reference numbers of the rear components are identified by suffix II. The vehicle 1 comprises a supporting structure S, an engine unit M and a kinetic unit C (schematically shown in FIG. 4).

Figure 4:
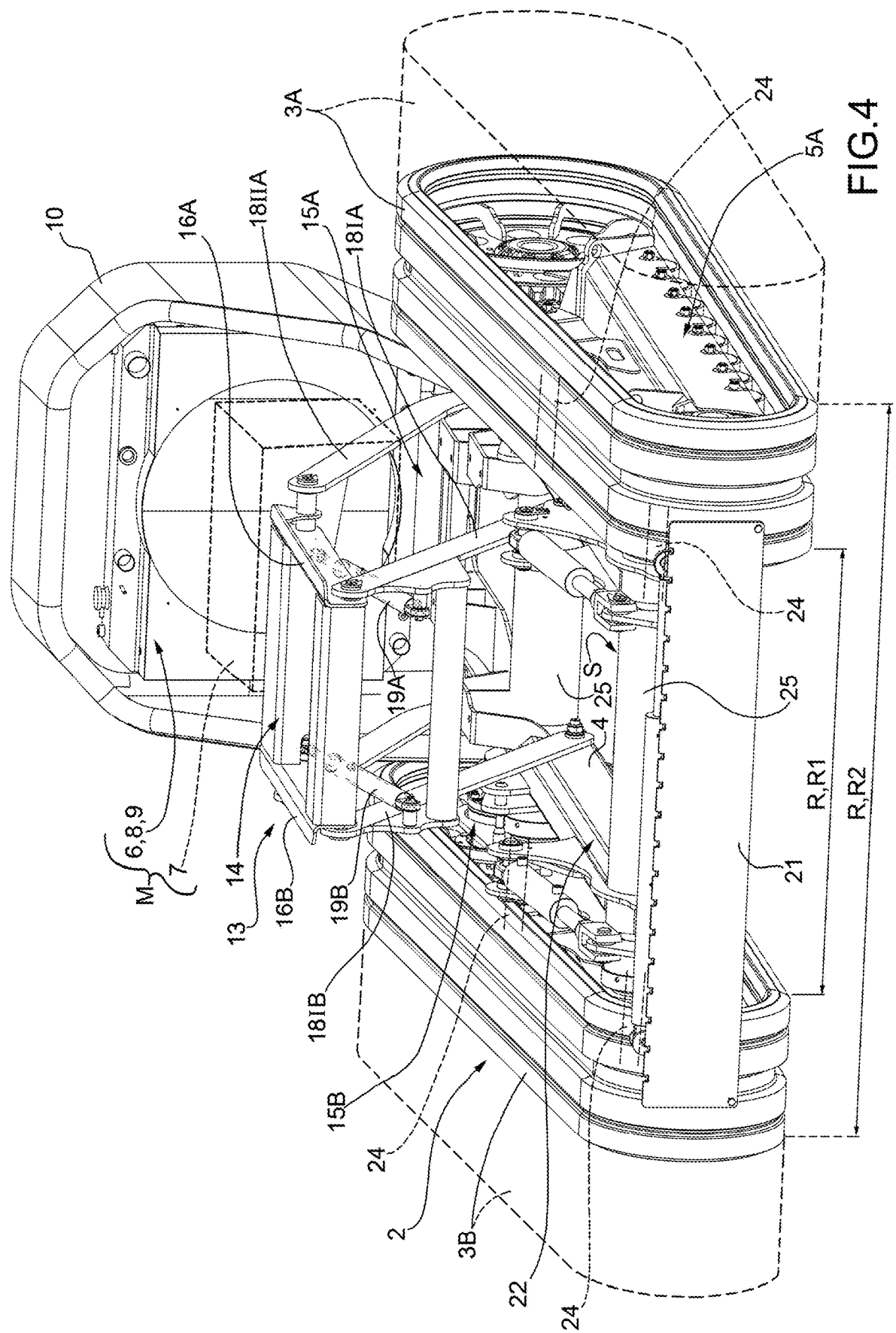
FIG. 4 is a perspective view, with some parts removed for greater clarity, of a vehicle according to the present invention.

According to the example shown in FIG. 4, the vehicle 1 comprises a motorized and tracked undercarriage 2 that incorporates the supporting structure S, the engine unit M and the kinetic unit C.

The undercarriage 2 can comprise tracks 3A, 3B in rubber or steel, or can permit replacement of the tracks 3A, 3B in order to change the type according to needs.

Figure 8:
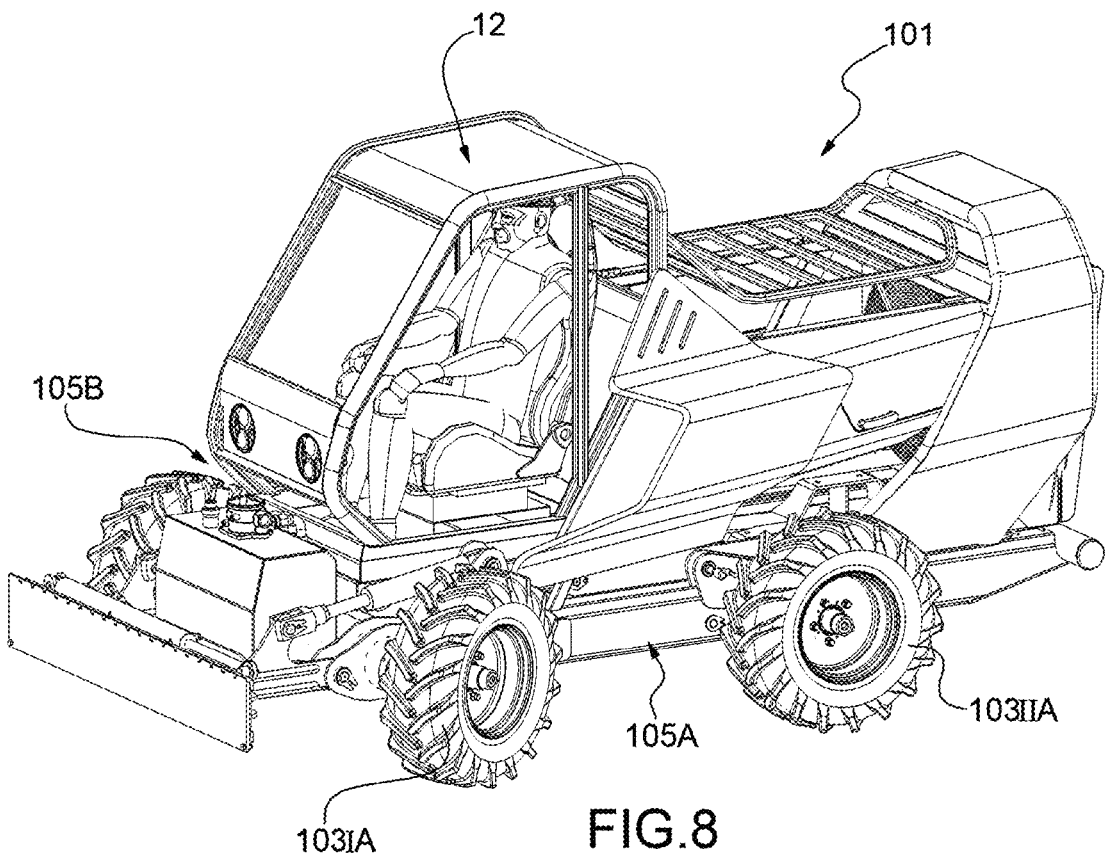
FIGS. 8 and 9 are perspective views of respective further embodiments of the vehicle of FIG. 1.
Figure 9:
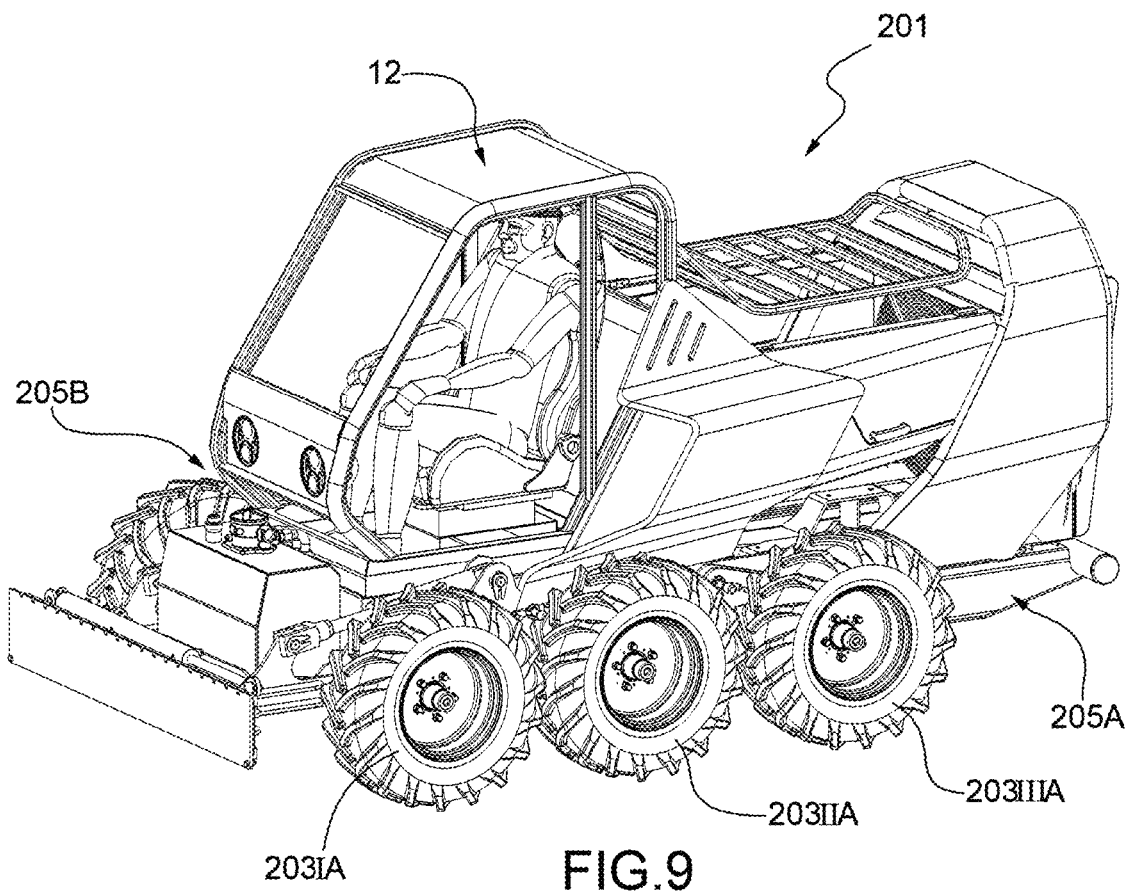

Alternatively, according to the variants shown in FIGS. 8 and 9, a vehicle 101 and 201 can comprise wheels 103 or 203 instead of the tracks 3A, 3B. The vehicle 101 shown in FIG. 8 has a kinetic unit with steerable wheels 103. Whereas the vehicle 201 shown in FIG. 9 has a kinetic unit with track-type steering, i.e. by blocking the set of wheels 203 of each side according to the steering requirements. The number of wheels 103 or 203 per side shown in FIGS. 8 and 9 is only for illustrative purposes and is not limitative. According to variants that are not shown, the vehicle could have a different number of wheels. A track-type steering system is preferable when the number of wheels is equal to or greater than three.

For simplicity of discussion, in the case of a wheeled application, by the term "carriage" we mean the system laterally connecting the wheels to the frame, for example side members. Therefore, in this description, when reference is made to a carriage, this also means system connecting any wheels to the frame. In FIG. 8, the vehicle 101 comprises a carriage 105 for each side that connects the respective wheels 103 to the frame 4. Similarly, in FIG. 9, the vehicle 201 comprises a carriage 205 for each side that connects the respective wheels 203 to the frame 4.

As shown in the figures, the undercarriage 2 comprises: a frame 4 (supporting structure S of the vehicle 1); a left carriage 5A and a right carriage 5B (kinetic unit C); a (schematized) engine 7, a hydraulic unit 6 and a radiator 8 (engine unit M).

Preferably, the radiator 8 comprises, in turn, a reversible fan 9. Advantageously, the radio-controlled vehicle 1 comprises a rollbar 10 configured to protect the radiator 8 and the reversible fan 9 from external impacts.

Advantageously, the engine 7 is a common rail turbo intercooler type. The engine 7 is positioned in front of the radiator 8.

The radio-controlled vehicle 1 further comprises a control system (of a known type and not shown) and a remote control 11, of a known type and schematically shown, configured to enable remote operating of all the drive systems of the radio-controlled vehicle 1.

Advantageously, the radio-controlled vehicle 1 comprises a cab 12 that can accommodate a person (the cab is visible in all the figures, except FIG. 4 where it is not shown for clarity). The cab 12 and the supporting structure S are mutually movable.

Advantageously, the radio-controlled vehicle 1 comprises an actuation unit 13, which is interposed between the supporting structure S, i.e. the frame 4, and the cab 12. The actuation unit 13 is configured to selectively change, according to needs, the position of the cab 12 with respect to the supporting structure S (i.e. the frame 4). The actuation unit 13 is hydraulically operated. Operation of the actuation unit 13 is regulated via the remote control 11.

According to the example shown in the figures, the actuation unit 13 comprises a mechanism known as a four-bar linkage. In particular, the actuation unit 13 essentially comprises a base 14 and two mechanisms 15A, 15B, hereinafter identified as the right mechanism 15B and the left mechanism 15A. The mechanisms 15A, 15B together with the frame 4 form two mutually parallel four-bar linkages that support the cab 12, as will be explained in greater detail below. The frame 4 is the fixed member of the four-bar linkages. The base 14 is fixed to the frame 4 by the mechanisms 15A, 15B so as to always remain parallel to the frame 4, i.e. parallel to a supporting plane n. According to a variant that is not shown, the actuation unit 13 can comprises only one mechanism or more than two mechanisms of the four-bar linkage type. The choice of two mechanisms 15A, 15B enables ensuring stability of the cab 12, better distributing the loads on the undercarriage 2 and keeping down the overall weight of the vehicle 1.

Figure 2:
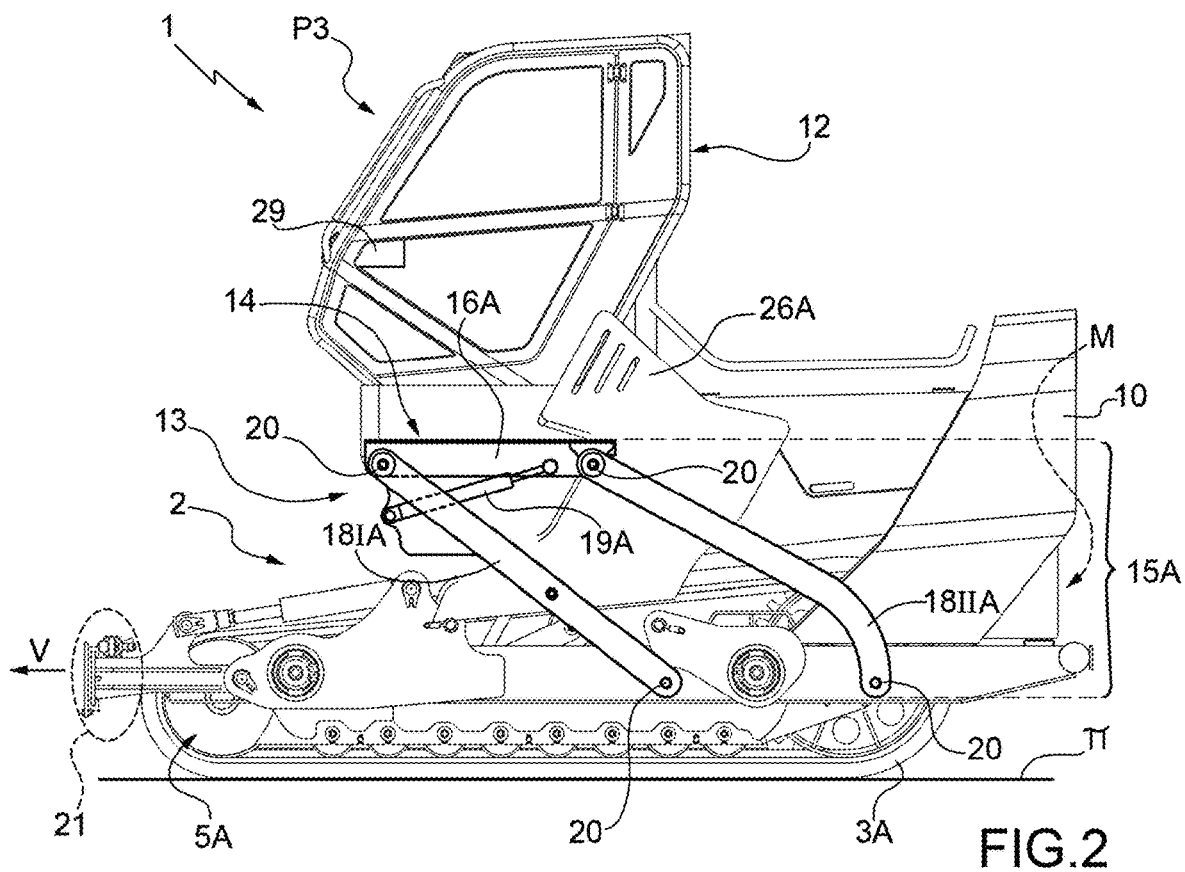
Figure 3:
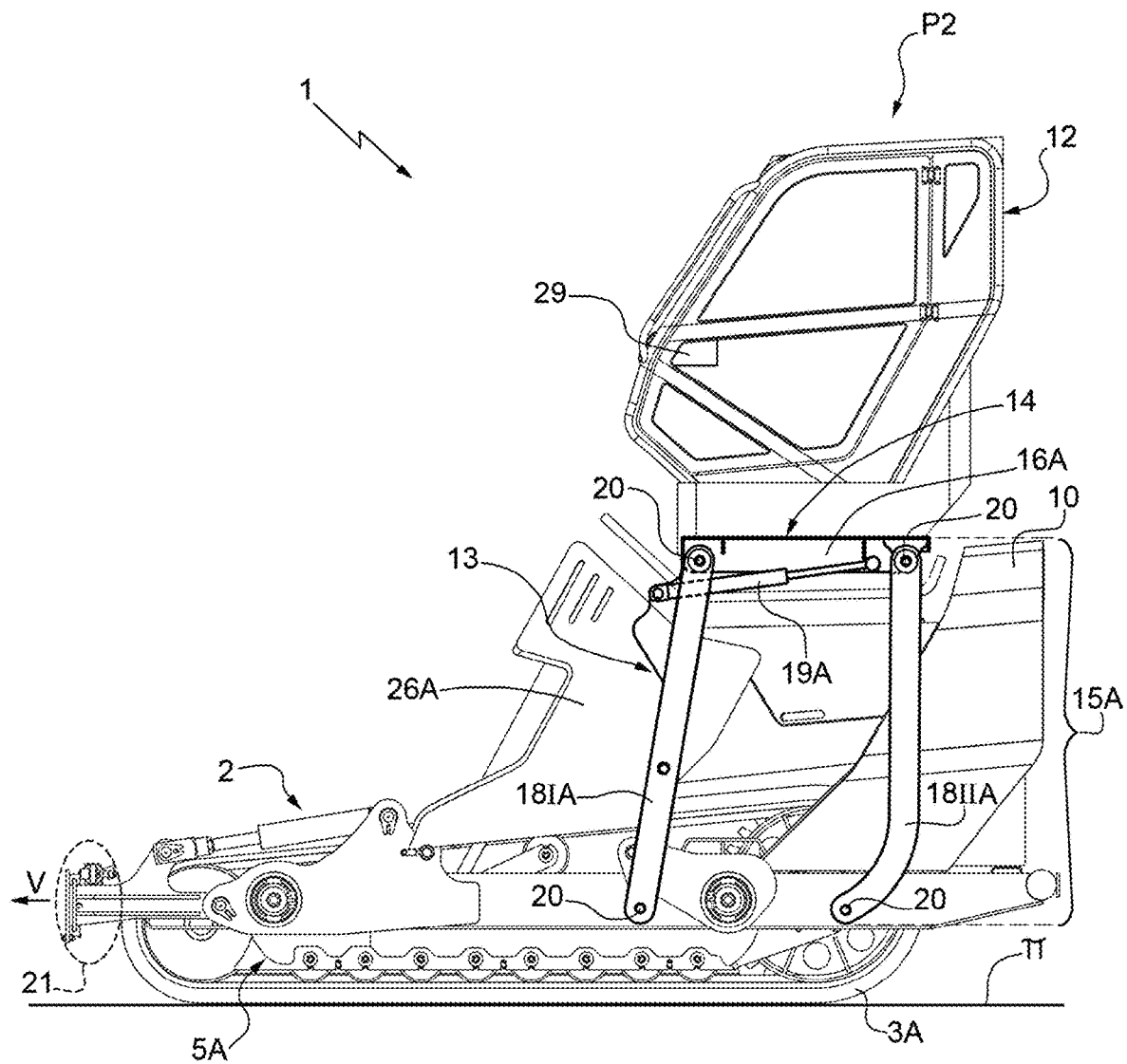

The cab 12 is fixed on the base 14 and is movable therewith from a lower position P1 (shown in FIG. 1) to an upper position P2 (shown in FIG. 3), and vice versa. FIG. 2 shows an intermediate position P3 of the cab 12, during the passing from the lower position P1 to the upper position P2. As shown in FIG. 1, the cab 12 is essentially resting on the frame 4 when in the lower position P1. The cab 12 is raised above the engine 7 when in the upper position P2.

According to a variant that is not shown, the cab 12 can be arranged in a plurality of different positions with respect to the base 14, for example two or more alternative positions. According to a variant that is not shown, the actuation unit 13 can comprise manually or automatically operated locks, to safely secure the cab 12 in a given position.

Entering into greater detail, the base 14 has a left side 16A and a right side 16B. The left mechanism 15A connects the left side 16A of the base 14 to the frame 4, while the right mechanism 15B connects the right side 16B of the base 14 to the frame 4.

The left mechanism 15A and the right mechanism 15B are the same and specular to each other. Each mechanism 15A, 15B comprises a front bar 18I and a rear bar 18II. The front bar 18I is hinged both to the base 14, in particular to the respective side 16 of the base 14 and to the frame 4.

Similarly, the rear bar 18II is hinged both to the base 14, in particular to the respective side 16 of the base 14 and to the frame 4.

In this way, translation of the base 14 parallel to the supporting plane n is achieved.

The actuation unit 13 further comprises an actuator 19 for each mechanism 15. Each actuator 19 causes the rotation of the respective front bar 18I and rear bar 18II, so as to obtain the movement of the base 14 and, consequently, of the cab 12. According to the example shown in FIGS. 1 to 3, the actuator 19 is a hydraulic cylinder that is fixed at one end to the base 14 and at the other end to the front bar 18I. Each hydraulic cylinder 19 is connected to the hydraulic unit 6. The activation of each hydraulic cylinder 19 is remotely performed via the remote control 11.

In this way, the movement of the rod of a hydraulic cylinder 19 causes the rotation of the bars 18 of the respective mechanism 15 (i.e. the four-bar linkage) and, consequently, the movement of the base 14. The actuator 19 can be made in different ways, as long as it generates the rotation of the bars 18 about the respective hinges 20. The vehicle 1 can thus be used for different activities, or rather is multipurpose, according to the type of equipment attached to the frame 4.

Advantageously, the vehicle 1 comprises a frontal hitching system 21, which enables fixing equipment T1, for example a mulcher as shown in FIGS. 5 and 6.

Advantageously, the frame 4 has a housing 22 in a substantially central area, i.e. beneath the position of the cab 12 when it is in the lower position P1.

Advantageously, the frame 4 has a central hitching system 23 (schematically shown in FIG. 7) arranged on the housing 22.

In this way, it is possible to attach equipment T2 in the housing 22 of the frame 4, while the cab 12 is in the upper position P2.

According to the example shown in FIG. 7, a boom mower T2 is fixed to the frame 4 at the central hitching system 23.

The vehicle 1 can therefore be used for different activities, or rather is multipurpose, according to the type of equipment T1, T2 attached to the frame 4.

According to variants that are not shown, different types of tools can be attached instead of the mulchers T1.

Advantageously, the undercarriage 2 has variable track width R. The track width is the distance between the tread centre of a track or a tyre (in the case of wheels on a same axle) and the tread centre of a parallel track or tyre. Advantageously, the undercarriage 2 is configured to allow widening or narrowing of the carriages 5A, 5B, depending on the type of use of the vehicle 1. In alternative, just a single carriage 5A, 5B can be moved, leaving the other carriage 5B or 5A fixed, i.e. it is possible to have independent widening of the two carriages 5A, 5B.

The widening of the carriages 5A, 5B can take place automatically with radio-controlled operation or manually.

According to the variants shown in FIGS. 8 and 9, the kinetic unit comprises a system with wheels 103, 203 instead of tracks. Also in this case, the track width can be variable, i.e. the distance between the wheels 103, 203 can be selectively increased or decreased, depending on the methods of use. The distance between the wheels can be set through the mutual movement of each carriage 105, 205 with respect to the frame. The carriages 105 and 205 of a vehicle 101 or 201 can be operated independently of one another.

FIG. 4 shows, with an unbroken line, the undercarriage 2 in a first operating configuration, in which the carriages 5A, 5B form a track width R1. FIG. 4 also shows, with a broken line, a further operating configuration of the undercarriage 2, in which the carriages 5A, 5B form a widened track width R2. The carriages 5A, 5B can be arranged according to a plurality of different relative positions (not shown) to obtain different respective track widths R of different widths.

Advantageously, a widened track width R, such as that shown with a broken line in FIG. 4, enables greater stability on very steep slopes (even up to approximately 60°).

Advantageously, the undercarriage 2 comprises a system with a plurality of double acting hydraulic cylinders 24 (shown in FIG. 4) that connect the right carriage 5A and the left carriage 5B to one another. In this way, the hydraulic cylinders 24 operate both of the carriages 5A, 5B of the undercarriage 2. Each hydraulic cylinder 24 is contained inside a respective guide 25. This enables a reduction in the space occupied by the undercarriage 2 and enables providing a central housing 22. The central housing 22 is provided in the space between the guides 25, in this way allowing the centre of gravity of the vehicle 1 to be lowered and the stability of the vehicle 1 to be increased.

Advantageously, the vehicle 1 comprises a left side protection 26A and a right side protection 26B, which project from the frame 4 and are substantially parallel to the left mechanism 15A and right mechanism 15B, respectively. The side protections 26A, 26B prevent an operator having free access to the left mechanism 15A and right mechanism 15B during use.

The cab 12 internally comprises a seat 28 for the operator and a dashboard 29 for supporting the remote control 11. In use, the operator inside the cab 12 continues to operate the vehicle 1 via the remote control 11.

From the foregoing description, the radio-controlled vehicle 1, 101, 201 has the advantage of being able to move the cab 12 from the lower position P1 to the upper position P2, depending on the type of use. FIGS. 5 and 6 show the radio-controlled vehicle 1 with a mulcher T1 attached to the frontal hitching system 21. In this case, the cab 12 can be left in the lower position P1, as shown in FIG. 5, or can be brought to the upper position P2, as shown in FIG. 6, from where the operator seated inside the cab 12 can have a better view of the area treated with the mulcher T1. In both operating configurations, the vehicle 1 can also be operated from a distance via the remote control 11.

As previously indicated, when the cab 12 is in the upper position P2, it is possible attach further equipment T2, in particular a boom mower, to the frame 4 at the central housing 22. According to the example shown in FIG. 7, a boom mower T2 is attached to the radio-controlled vehicle 1 at the central housing 22. FIG. 7 also shows a mulcher T1 attached to the front hitching system 21. Therefore, the radio-controlled vehicle 1 can be used to simultaneously operate a plurality of tools T1, T2. In particular, the radio-controlled vehicle 1 shown in FIG. 7 enables mowing both the ground over which the radio-controlled vehicle 1 passes and a portion of ground to the side of the radio-controlled vehicle 1.

As shown in the figures, the equipment T1, T2 is advantageously attached in front of the cab 12, so that when seated inside the cab 12 an operator can have a complete view of the area being treated with the front mulcher T1.

Furthermore, as the cab 12 is movable, an operator can decide to change position during use, for example from the lower position P1 to the upper position P2, so as to increase visibility.

Advantageously, the fact that the frame 4 has a central housing 22 enables attaching possible additional equipment T2 in a central area of the radio-controlled vehicle 1, contributing to increased stability of the radio-controlled vehicle 1 during use.

Advantageously, the fact that the radio-controlled vehicle 1 comprises tracked carriages 5A, 5B enables use of the radio-controlled vehicle 1 on any type of terrain. In other words, the radio-controlled vehicle 1 is not constrained to being used only on roads, which is instead necessary for other types of vehicles.

Advantageously, the fact that the radio-controlled vehicle 1 has an undercarriage 2 that can be widened enables increasing the stability of the radio-controlled vehicle 1 even when travelling along very steep slopes.

Advantageously, the fact that the vehicle 1 is radio controllable enables an operator to remotely operate the vehicle 1. In this regard, the figures also show an operator outside of the vehicle 1 to demonstrate that the vehicle can also be operated even if the operator is not on board the vehicle 1. In this way, an operator can leave the vehicle 1 during work on particularly rough terrain, for example with steep slopes, and thus work in safety.

Advantageously, the fact that the cab 12 can be arranged in the lower position, i.e. a lowered position, enables the vehicle 1 to travel at higher speeds than the working speed, when transferring the vehicle 1 from one location to another. Advantageously, when the cab 12 is in the lower position and equipment T1 is not in operation and is raised from the ground, the vehicle 1 can even proceed at a speed of approximately 30 km/h.

Advantageously, when the cab 12 is arranged in the upper position, i.e. the raised position, the vehicle 1 travels at a lower speed, but the operator is kept at a safe distance from equipment T1 and has a position that allows a better field of view from above.

The invention claimed is:
1. A radio-controlled vehicle comprising:
a supporting structure having a central housing;
a central hitching system at the central housing for fixing, in use, central equipment;
an engine unit;
a kinetic unit;
a remote control that remotely operates the radio-controlled vehicle;
a cab configured to house, in use, a person,
wherein the cab is selectively movable with respect to the supporting structure among a lower first position, an upper second position and an intermediate position between the lower first position and the upper second position, wherein the central housing is beneath the cab when the cab is in the lower first position, and wherein the cab moves to the upper second position or the intermediate position to permit the fixing of the central equipment.

2. The radio-controlled vehicle according to claim 1, further comprising:

an actuating unit interposed between the cab and the supporting structure, wherein the actuating unit is configured to move the cab from a first position to one or more alternative positions, and wherein the actuating unit can be activated by the remote control.

3. The radio-controlled vehicle according to claim 2, wherein the actuation unit comprises one or more mechanisms, wherein each mechanism forms a four-bar linkage and each mechanism is interposed between the supporting structure and a base to move the base always parallel to a supporting plane, wherein the cab is fixed on the base, wherein the actuating unit comprises an actuator for each mechanism, and wherein each actuator can be activated by the remote control.

4. The radio-controlled vehicle according to claim 3, wherein each mechanism comprises a front arm and a rear arm, in which each arm is hinged at its own first end to the base and at its own second end to the supporting structure, wherein each mechanism comprises an actuator that rotates the arms.

5. The radio-controlled vehicle according to claim 4, wherein the actuator is a hydraulic cylinder that is fixed at one end to an arm and at the other end to the base.

6. The radio-controlled vehicle according to claim 1, further comprising:

a front hitching system arranged in front of the cab, and protruding in front of the supporting structure with respect to a driving direction of the radio-controlled vehicle, wherein the front hitching system is configured to fix, in use, frontal equipment to the radio-controlled vehicle.

7. The radio-controlled vehicle according to claim 6, further comprising: a front bush cutter coupled to the front hitching system and/or a bush cutter with an arm fixed to the central hitching system of the central housing.

8. The radio-controlled vehicle according to claim 1, wherein the supporting structure, the engine unit and the kinetic unit are part of a tracked undercarriage.

9. The radio-controlled vehicle according to claim 1, wherein the supporting structure comprises a frame, side members and wheels.

10. The radio-controlled vehicle according to claim 1, wherein the kinetic unit is configured to vary track width according to need in manual or automatic mode by the remote control.

11. The radio-controlled vehicle according to claim 10, wherein the supporting structure comprises a first and a second carriage connected to each other by a frame, wherein each carriage is independently movable with respect to the frame.

12. The radio-controlled vehicle according to claim 11, wherein the variation of the track width is automatic and can be activated by the remote control, wherein the frame comprises one or more double-acting cylinders each of which is contained within a respective protection guide, wherein each carriage is integral with a respective end of the double-acting cylinder, and wherein the double-acting cylinder can be actuated by the remote control.

* * * * *